United States Patent
Taga et al.

[11] Patent Number: 5,305,143
[45] Date of Patent: Apr. 19, 1994

[54] INORGANIC THIN FILM POLARIZER

[75] Inventors: Yasunori Taga; Motofumi Suzuki; Tadayoshi Itoh, all of Aichi, Japan

[73] Assignee: Kabushiki Kaisha Toyota Chuo Kenkyusho, Aichi, Japan

[21] Appl. No.: 743,190

[22] Filed: Aug. 9, 1991

[30] Foreign Application Priority Data

Aug. 9, 1990 [JP] Japan .................. 2-212125

[51] Int. Cl.$^5$ .............................................. G02B 5/30
[52] U.S. Cl. ...................................... 359/488; 359/490; 359/492; 252/585; 428/434; 428/701; 428/702
[58] Field of Search ............... 359/352, 360, 485, 486, 359/487, 488, 490, 491, 492; 252/584, 585; 428/323, 325, 328, 330, 331, 332, 432, 433, 434, 689, 701, 702

[56] References Cited

U.S. PATENT DOCUMENTS

| 2,199,227 | 4/1940 | Marks | 359/492 |
| 3,117,177 | 1/1964 | Kahn et al. | 359/488 |
| 3,245,316 | 4/1966 | Janetos et al. | 359/488 |
| 3,619,235 | 11/1971 | Furuuchi et al. | 359/360 |
| 3,653,741 | 4/1972 | Marks | 359/488 |
| 3,671,102 | 6/1972 | Clawson et al. | 359/486 |
| 3,969,545 | 7/1976 | Slocum | 359/352 |
| 4,268,127 | 5/1981 | Oshima et al. | 359/488 |
| 4,874,664 | 10/1989 | Hamaguchi et al. | |

OTHER PUBLICATIONS

Japanese Journal of Applied Physics, vol. 20, No. 7, Jul. 1981, pp. 1249-1253 "Grain Structure and Magnetic Anisotropy of Fe Film Evaporated Obliquely from Two Sources".

Primary Examiner—Scott J. Sugarman
Assistant Examiner—R. D. Shafer
Attorney, Agent, or Firm—Oblon, Spivak, McClelland, Maier & Neustadt

[57] ABSTRACT

An inorganic thin film polarizer having polarization characteristics comprises: a matrix for thin film polarizer composed of fine columns thereof arranged on a substrate; and light absorbing portions provided on the columns. The columns are made of inorganic substance which is transparent in the desired wavelength region of light such as the visible light region, ultraviolet region and infrared region, and each column has a substantially circular cross section. The columns are tilted at a constant angle with respect to a surface normal of the substrate and has anisotropy in density. The light absorbing portions have a light extinction coefficient larger than that of the columns at the desired wavelength region of light. The columns are arranged at a spacing of from 0.2 to 20 times the diameter of the column.

14 Claims, 10 Drawing Sheets

F I G. 3
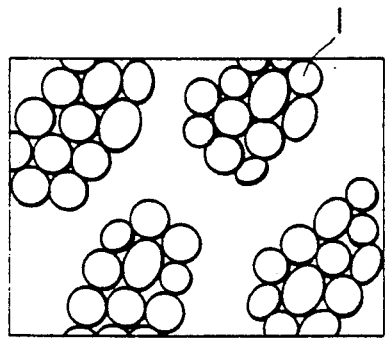
F I G. 4
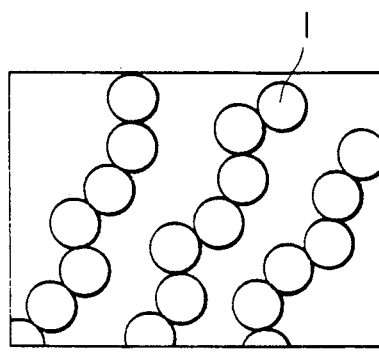
F I G. 5
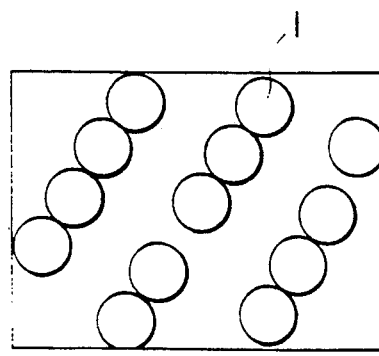

F I G. 6(g)
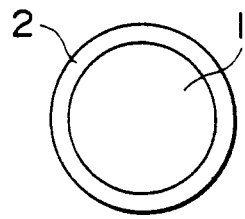
F I G. 6(h)
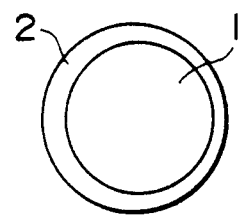
F I G. 6(i)
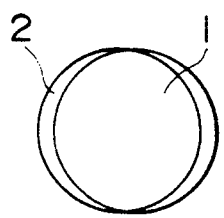
F I G. 6(j)
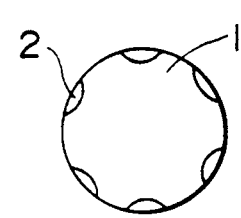
F I G. 6(k)
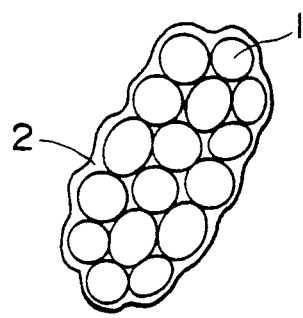

INORGANIC THIN FILM POLARIZER

BACKGROUND OF THE INVENTION

1. Field of the Invention

The present invention relates to an inorganic thin film polarizer. More specifically, the present invention relates to an inorganic thin film polarizer having improved resistances against heat and weathering. The thin film polarizer comprises a matrix for the polarizer which is made of an inorganic material and composed of columns, and light absorbing portions formed on the surface thereof.

2. Description of the Related Art

Polarizers constitute one of the fields of advanced materials now placed under active R & D. For example, sheet polarizers are used in combination with liquid crystals and are incorporated in thin LCD's (Liquid Crystal Displays) which are now widely utilized in liquid crystal display devices of compact calculators and wrist watches, taking their advantage of low electric power consumption, low voltage drive, thin body, and large display area. To this end, the application field of the LCD's is expanding with the progress in the field of electronics, and the LCD's are replacing the CRT displays conventionally used in TV sets and in display devices of personal computers and word processors. Furthermore, their application is now intensively developed, for example, to depolarization plates and circular polarizers, three-dimensional image processing (e.g., X-ray and motion pictures), OA (office automation) machines, polarizer lens, partial detectors, glare shields, dimmers, and the field of cameras.

Since a polarizer transmits the light whose electric vector is parallel to one of the principal axes, i.e. "polarizing axis", while absorbs or scatters the light when the electric vector of the incident light is perpendicular to the polarizing axis, the sheet polarizer has a function to select a linear polarized light from a unpolarized light or to extinct the light whose electric vector is not parallel to the polarizing axis.

The conventional sheet polarizers have been produced by: stretching an organic material such as polyvinyl alcohol (PVA) and polyvinyl chloride (PVC); adsorbing iodine or dyes, which is dichroic molecule, in the stretched sheet or by dehydrating or dechlorinating PVA or PVC, to thereby give dichroism to the sheet; and thereafter laminating or coating both sides of the sheet having dichroism with the layers of a matrix (e.g., triacetyl cellulose, polyethylene terephthalate, and polymethyl methacrylate). However, the conventional sheet polarizers composed mainly of organic materials are disadvantageous in that they are liable to decompose or deteriorate under ultraviolet (UV) light, heat, moisture, or certain types of organic solvents. Moreover, they also suffer poor mechanical strength. Since the sheet polarizers are provided in film sheets, their assembly into a display device and the like requires additional manufacturing steps of cutting and laminating. It is another problem that such sheet polarizers have difficulty in applying them to products having complicated or curved shapes, or to those particularly small in size.

As a method for overcoming the problems mentioned hereinbefore, there is proposed a "Process for Producing Polarizers" as disclosed in Japanese Unexamined Patent Publication No. 54-143658. The process as disclosed therein comprises steps of: depositing a planar layer of an electrically conductive material on a glass substrate at a deposition angle of 90°, and irradiating a particle beam to the deposition layer at a proper angle of incidence to thereby provide a plurality of fine etched bands running parallel to each other. In this manner, a polarizer comprising a plurality of electric conductive bands arranged in parallel to each other at a grid spacing of about one tenth of the wavelength of light can be produced on the glass substrate. The disclosure teaches that this process enables production of low cost polarizers having a long life and good reproducibility. However, the polarizers obtained by this process comprises an electric conductive substance such as a metal in the light absorbing portion, and the structure is such that this light absorbing portion is exposed on the surface of the polarizer. Since electric conductive substances such as metal are generally soft and are thereby inferior in abrasion resistance, conventional polarizers required a protective film to compensate for the insufficient abrasion resistance. The irradiation of a particle beam onto the surface of the polarizer inevitably requires use of a glass substrate, and this makes it difficult to produce flexible polarizers as compared with the organic film polarizers. Furthermore, the irradiation of particle beams arranged in one direction over a large area is also difficult to achieve in this conventional process for producing polarizers. Hence, large scaled polarizers have not been feasible with the conventional process.

SUMMARY OF THE INVENTION

In the light of the circumstances described above, the present inventors conducted intensively studies to overcome the problems of the conventional technology, and have completed the present invention by carrying out systematic experiments.

An object of the present invention is to provide an inorganic thin film polarizer having excellent resistances against weathering and heat.

With respect to the problems described hereinbefore, the present inventors have noticed the following points. That is, the oxide film deposited obliquely produces a fine columnar structure comprising an arrangement of columns tilted at a constant angle, said columns having anisotropy in density which consequently causes anisotropy in the refractive index. Accordingly, the resulting film had birefringence, and by coloring these columns, it was thought possible to obtain a thin film having not only birefringence but also dichroism. Inorganic substances including oxides have high mechanical strength as well as excellent resistances against weathering and heat. If a coloring substance made of an inorganic substance were to be added, a dichroic thin film having excellent mechanical strength as well as resistances against weathering and heat can be obtained. Furthermore, since the structure of these substances can be easily obtained by vacuum deposition or by sputtering, low cost polarizers can be readily fabricated at high reproducibility regardless of the material, shape, and the size of the matrix. Accordingly, inorganic thin film polarizers free from the problems mentioned above can be obtained, if the dichroism of the obliquely deposited film of the colored inorganic substance were to be sufficiently increased.

However, in a structure such as of partially reduced oxides, in which the columns are uniformly colored, it seems impossible to sufficiently increase the dichroism in view of its birefringence. If a polarizer were to be fabricated with such a structure, the transmittance of the whole device would be considerably lowered. Accordingly, the present inventors separated the column into two phases, i.e., a portion which is transparent in the desired wavelength region and a light absorbing portion, to thereby give a novel structure to overcome the problem mentioned above. Thus was achieved a thin film polarizer capable of sufficiently polarize the light without reducing the transmittance. That is, the problems of the conventional technology were overcome by fabricating a thin film polarizer by first depositing a substance which is transparent in the desired wavelength region of light by oblique vapor deposition or the like to obtain a columnar structure, and then forming on the surfaces of the columns portions of an inorganic substance having a larger light extinction coefficient in the desired wavelength region as compared with that of the columnar portion.

The inorganic thin film polarizer according to the first aspect of the present invention comprises:

(I) a matrix for thin film polarizer composed of fine columns or of collective bodies thereof, the columns being made of an oxide or other stable inorganic substance which is transparent in a desired wavelength region of light such as the visible light region, ultraviolet region, and infrared region and having a substantially circular cross section, and the columns and collective bodies thereof being arranged on a substrate and tilted at a constant angle with respect to a surface normal of the substrate and having anisotropy in density; and (II) light absorbing portions provided on the surface of the columns, which is made of inorganic substance having a light extinction coefficient larger than that of the columns in the desired wavelength region of light, the columns or the collective bodies thereof being arranged at a spacing of from 0.2 to 20 times the diameter or width of the column or the collective body thereof.

Although there is yet more to be clarified, the mechanism of the excellent effect exerted by the inorganic thin film polarizer according to the present invention can be explained as follows.

The unit element of the matrix for the thin film polarizer according to the present invention is a very fine column having a substantially circular cross section which is made of a stable inorganic substance such as an oxide, being transparent in the wavelength region of light such as the visible light region, ultraviolet region, and infrared region. The matrix for the thin film polarizer is composed of such columns or the collective body thereof being tilted at a constant angle with respect to the substrate, arranged at a spacing of from 0.2 to 20 times the diameter or width of the column, and having an anisotropy in density. This anisotropy in density imparts the thin film polarizer an optical anisotropy.

The light absorbing portion is provided on the surface of the columns constituting the matrix for the thin film polarizer described hereinabove, and is made of an inorganic substance larger than the columns in light extinction coefficient at the desired wavelength region of light. Since the light absorbing portion is established on the surface of the columns, it is possible to avoid extreme reduction of transmittance by sufficiently reducing its size with respect to the bulk. Thus, the anisotropic optical properties of the matrix for the thin film polarizer can be well reflected and can thereby cause anisotropic light absorption. That is, the light absorption is larger for the light along the denser direction of the matrix for the thin film polarizer and is less for the light along the sparser direction. In this way, the anisotropy in the absorption of light is realized.

Another characteristic feature of the inorganic thin film polarizer is the internal structure of the film. Since the matrix for the thin film polarizer comprises columns, it is possible to avoid the scattering of light by reducing the size of columns well below the desired wavelength of the light. Since the structure comprises tilted fine columns or the collective bodies thereof being arranged at a spacing therebetween of from 0.2 to 20 times as large as the diameter of the column, it is also possible to sufficiently increase the transmittance to obtain a favorable polarization characteristics. That is, by tilting a desired number of the columns or the collective bodies thereof at a constant angle with respect to the substrate, the size of the light absorbing portion as compared to the bulk can be reduced, thereby properly dispersing the light absorbing portion without concentrating it to a particular area.

Furthermore, since a stable matrix for the thin film polarizer protects the light absorbing portion, the resulting thin film polarizer is expected to have high mechanical strength and excellent resistances against weathering and heat.

Thus, the thin film polarizer according to the present invention provides a favorable polarization characteristics.

The thin film polarizer according to the present invention is also improved in resistances against weathering and heat.

BRIEF DESCRIPTION OF THE DRAWINGS

FIGS. 3 to 5 are the schematically shown examples of the structural arrangements of the thin film polarizers according to the present invention;

FIGS. 6(a) to 6(k) are the schematic cross sections of the surface of the columns of the thin film polarizers according to the present invention, having the light absorbing portion(s) provided thereon; In the drawings, the columns are labeled (1) while the light absorbing portions are numbered (2).

FIGS. 10 to 13 are the electron micrographs showing the shapes of the cross section of the thin film polarizer obtained in Example 1, wherein, FIG. 10 is the electron micrograph showing the shape of the cross section of Specimen 1 (magnification: 200,000×), FIG. 11 is the electron micrograph showing the shape of the cross section of Specimen 5 (magnification: 100,000×), FIG. 12 is the electron micrograph showing the shape of the cross section of Specimen 5 (magnification: 200,000×), and FIG. 13 is the electron micrograph showing the shape of the cross section of Specimen 7 (magnification: 200,000×)

DETAILED DESCRIPTION OF THE INVENTION

Matrix for the Thin Film Polarizer

The matrix for the thin film polarizer of the thin film polarizer according to the present invention comprises an arrangement of columns or collective bodies thereof, with desired number thereof being tilted at a constant angle with respect to a surface normal of the substrate. The substrate for use in the thin film polarizer according to the present invention is made of an inorganic material such as glass and silicon, or an organic material such as resins, which is transparent in the desired wavelength region of light in at least one of the visible light region, the ultraviolet region, and the infrared region. Specifically, the substrate may be, for example, various types of glass substrates, or those made of polymer films such as polyethylene terephthalate (PET), and plastics such as acrylic plastics and styrene plastics.

The matrix for the thin film polarizer comprises columns as the unit elements and said columns are made of a stable inorganic substance including an oxide, being transparent in the desired wavelength region of light in at least one of the visible light region, the ultraviolet region, and the infrared region.

Specific substances for use as the columns include, for the visible and the infrared regions, tantalum oxide ($Ta_2O_5$), silicon dioxide ($SiO_2$), magnesium oxide (MgO), aluminum oxide ($Al_2O_3$), titanium oxide ($TiO_2$), zinc oxide ($ZnO_2$), germanium oxide ($GeO_2$), molybdenum oxide ($MoO_3$), indium oxide ($In_2O_3$), tin oxide ($SnO_2$), tungsten oxide ($WO_3$), and a compound of two or more thereof; for the infrared region, examples are silicon (Si) and germanium (Ge); and for the region ranging from the ultraviolet to the infrared region, mentioned are inorganic substances such as silicon dioxide ($SiO_2$). Particularly preferred among them are $SiO_2$ and $Ta_2O_5$, since they are transparent over a wide region and have high chemical and thermal stabilities.

Figure 2A:
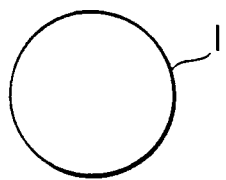
FIGS. 2(a) to 2(c) are the schematically shown shapes of the cross section of the columns of the thin film polarizers according to the present invention.
Figure 2B:
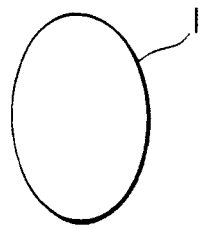
Figure 2C:
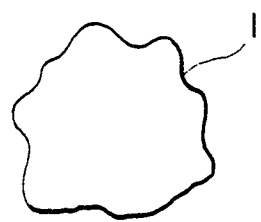

The columns are fine and the shape of the cross section thereof is substantially circular. The cross section may exhibit a strictly circular shape as shown in FIG. 2(a), an elliptical shape with a major axis to the minor axis ratio of less than 3 as shown in FIG. 2(b), or a shape with the periphery thereof having some irregularities as shown in FIG. 2(c).

The diameter of the column is preferably in the range of from 5 to 100 nm. The diameter of the column refers herein to the diameter in the case the cross section thereof is a true circle; to the mean of the major and the minor axes if the cross section has a shape of an ellipsoid; and to the mean diameter if the cross section has a periphery having irregularities. A column having a diameter of less than 5 nm may cause a fine structure as compared with the wavelength of the light, i.e. a uniform substance under the light without anisotropy, whereas a column having a thickness exceeding 100 nm may provide a structure having a size in the same order of the wavelength of the light. This may cause scattering of the light and render the column opaque.

A single column, a plurality of columns bundled into a collective body, or both the single column and the collective body thereof may be the constitutional element. The collective body of the columns here is produced by aggregation or coagulation of the columns, which are preferably 200 nm or less in diameter to avoid the opaque state. It is preferred that the tilting direction of the columns or the collective bodies thereof is as close as the direction normal to the substrate. However, the anisotropy in the density becomes smaller as the tilting direction approaches the normal, and it is therefore preferred that the tilting direction is as close to the normal as possible so long as the anisotropy in the density is well maintained.

The structural arrangement of the column and/or the collective bodies thereof preferably has an orientation (anisotropy). That is, preferably, the columns are arranged densely along the direction perpendicular to the plane spanned between the surface normal of the substrate and the tilting direction thereof, and are sparsely arranged along the direction perpendicular to the tilting direction thereof in the plane. Such a structure provides a larger anisotropy in the density, said anisotropy increasing with stronger orientation in the arrangement of the columns. Accordingly, the arranged structure of the columns preferably has a strong orientation.

In FIG. 3 is schematically given an example of the structural arrangement described above. The structure may be such comprising columns and/or collective bodies thereof being slightly ordered (see FIG. 3); such comprising one-direction oriented alignments of columns and/or collective bodies which may have some irregularities (FIG. 4); and such comprising one-direction oriented alignments of columns and/or collective bodies thereof free from irregularities (FIG. 5). The anisotropy in density is increased and thereby more preferred as the matrix for the thin film polarizer in the structures shown in the figures, in the order of FIG. 3, FIG. 4, and FIG. 5. However, the structure shown in FIG. 3 is advantageous from the viewpoint of ease in producing the structure.

It is requisite that the matrix for the thin film polarizer is transparent in the desired wavelength region and that it is chemically and thermally stable. The matrix for the thin film polarizer singly should have preferably a transmittance of 80% or larger.

The matrix for the thin film polarizer has an anisotropy in density, since it comprises columns being tilted along a constant direction with respect to a surface normal of the substrate and arranged at a spacing therebetween of from 0.2 to 20 times the diameter of the columns. The total volume of columns preferably accounts for 40% or less of the total volume of the thin film polarizer.

The inorganic thin film polarizer comprises columns having light absorbing portions provided on the surface thereof. It is preferred that growth direction of the columns is as close as possible to the normal of the substrate, since the light transmittance and the polarizance both approach maxima in the longitudinal direction of the columns. The column must be sufficiently large in diameter so that it may interact with the light of wavelength intended for the polarization. Reversely, however, a column having a diameter equal to or larger than the desired wavelength of the light causes scattering thereof. Thus, the diameter of the column preferably is about one tenth of the desired wavelength of light. The length of the column preferably is about the same as the thickness of the film. This signifies that the columns are continuously extended from the interface between the substrate and the columns to the surface of the film without any interruption. An interruption may produce an interface which becomes the scattering center of the light. Accordingly, the length of the columns are preferably about the same as the film thickness, more specifically, in the range of from about 0.1 to 10 μm.

Light Absorbing Portion

The thin film polarizer according to the present invention comprises light absorbing portions provided on the columns described hereinabove, which are made of an inorganic material having a larger light extinction coefficient as compared with that of the columns.

The light absorbing portion preferably is made of an inorganic material larger than the column in the light extinction coefficient in the desired wavelength region, and having a large light extinction coefficient and is less susceptible to oxidation. Preferred examples of such materials to be used in the light absorbing portion include metals such as copper (Cu), silver (Ag), gold (Au), iron (Fe), cobalt (Co), nickel (Ni), platinum (Pt), tantalum (Ta), and iridium (Ir). Metals mentioned above are preferred since they have a large extinction coefficient in the wavelength region ranging from the ultraviolet to the infrared region, are resistant to oxidation, and have melting points far higher than those of the organic materials. Among the metals exemplified above, Cu, Ag, and Au have plasma frequency of free electrons in the region over the near ultraviolet to the visible. Thus, if those metals were to be dispersed in a dielectric as small particles, a optical plasma resonance absorption occurs in the visible light region. This resonance absorption is particularly sensitive to the refractive index of the surroundings and to the morphological state of the dispersion of the metal. Accordingly, the use of this resonance absorption provides a favorable polarization characteristic. As the semiconductors for use as the light absorbing portion, mentioned are SnTe, PbSe, PbTe, Si, and Ge. These semiconductors are apt to absorb light in the visible region, and are suitable as freely designed thin film polarizers. In addition to the materials above, there can be further mentioned electrically conductive oxides such as ITO (Indium Tin Oxide) and ZnO, which have a large extinction coefficient in the infrared region and are useful as thin film polarizers having an infrared shielding function.

The light absorbing portion preferably is established at an amount which least lowers the transmittance of the matrix for the thin film polarizer by only a minimum necessary degree, and is provided at a smallest amount necessary to impart the matrix for the thin film polarizer the required polarization characteristics.

An example of the structure of the light absorbing portion is explained making reference to FIGS. 6(a) to 6(k), FIGS. 7(a) to 7(c), and FIGS. 8(a) to 8(c). A view of the cross section of the column to which the light absorbing portion is established is shown schematically in FIGS. 6(a) to 6(k).

Figure 6A:
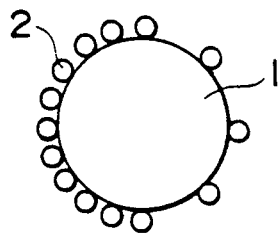
Figure 6B:
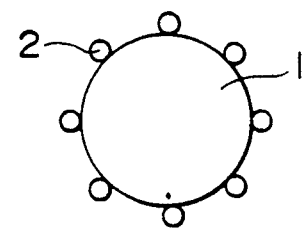
Figure 6C:
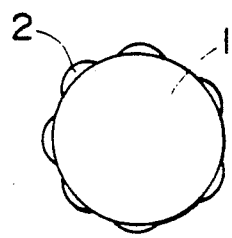
Figure 6D:
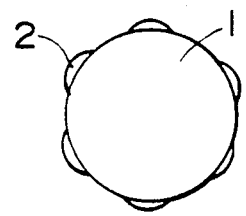

FIGS. 6(a) to 6(d) show the example of a column comprising fine grains or islands of light absorbing substance provided on the surface thereof. In FIG. 6(a) is provided an example of a column in which one outer surface portion of the column is densely provided with fine grains of a light absorbing substance, while the opposite outer surface portion is formed with little or no light absorbing substance. In such a case, the transmittance of the light component along the denser direction is low, and that of the light component in the direction perpendicular thereto is high. This signifies that the anisotropy in the light absorbing portion can be increased by controlling the coating morphology of the light absorbing portion. FIG. 6(b) shows an example in which fine granular light absorbing substance is uniformly deposited on the whole surface of the outer periphery of the column. In FIG. 6(c) is an example of a column in which islands of a light absorbing substance are densely provided on one surface portion thereof, while no or little light absorbing substance is provided on the opposite surface portion thereof. FIG. 6(d) shows an example in which islands of a light absorbing substance are uniformly deposited on the whole surface of the outer periphery of the column.

The optical properties of the fine granular or island-like thin films of the light absorbing substances as shown in FIGS. 6(a) to 6(d), which are deposited on the surface of the columns, are greatly different from those of the bulk light absorbing substance; they are much influenced by the refractive indices of the materials surrounding them and by the distance between the granules or islands. For example, when the granules or islands is provided at a long spacing, i.e., when they are dispersed, the transmittance generally tend to increase. When the spacing is reversely shortened, various interactions including the dipole-dipole interaction occur among the granules to decrease the transmittance. Accordingly, depositing the light absorbing portion in fine granules or islands as shown in FIGS. 6(a) to 6(d) enables control of the light transmittance by changing the mode of their dispersion. Among the thin structures shown in FIGS. 6(a) to 6(d), those shown in FIGS. 6(b) and 6(d) utilize only the anisotropy in density and not the anisotropy resulting from controlling the dispersion of the fine granules and islands of the light absorbing substance. The structures shown in FIGS. 6(a) and 6(c) are intended for further improved polarization characteristics, by additionally taking advantage of the anisotropy resulting from the fine grains or islands of the light absorbing substance having dispersed with a certain distribution.

Figure 6E:
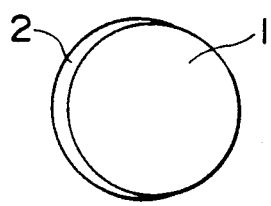
Figure 6F:
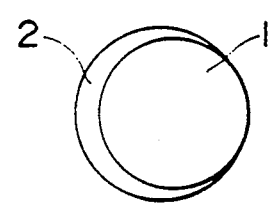

FIGS. 6(e) to 6(i) show examples in which a light absorbing substance is deposited partly or wholly on the surface of the column. FIG. 6(e) shows an example of a column comprising the light absorbing substance covering about 50% of the surface; FIG. 6(f) shows an example of a column comprising the light absorbing substance covering 50% or more of the surface; FIG. 6(g) shows an example of a column comprising the light absorbing substance covering the whole surface; FIG. 6(h) shows an example of a column comprising the light absorbing substance covering the whole surface with thickly covered portion and thinly covered portion being mixed therein; and FIG. 6(i) shows an example of a column comprising the light absorbing substance covering the facing portions on the column surface thickly (densely) and covering the remaining portions (about 90° distant from the thickly covered portions) thinly (sparsely) or not covering at all. Among the structures above, those having distribution in the coated amount as shown in FIGS. 6(e), 6(f), 6(h), and 6(i) can further enhance the optical anisotropy in addition to that resulting from the matrix for the thin film polarizer, by controlling the direction of the distribution, and thereby improving the polarization characteristics. This is because more light is absorbed at the thicker coating; thus, in the structures shown in FIGS. 6(e), 6(f), 6(h), and 6(i), the light whose electric vector is in the vertical direction in the figures is more absorbed than the light whose vector is in the horizontal direction. It is therefore expected that the structures shown in FIGS. 6(e) and 6(i) show higher performances. It should be noted, however, that a continuously deposited film has a light absorption far larger than that of fine grains; therefore, such films should be thinly deposited.

FIG. 6(j) shows an example of a column in which islands of a light absorbing substance are provided from the surface portion toward the inside portion. In this case, the light absorbing substance may be provided either in fine grains or in films.

In FIG. 6(k) is shown an example in which a collective body of the columns is coated with a light absorbing substance. In this case, either one surface or the whole surface of the collective body may be coated, and the morphological variation of the coating is the same as described in the previous cases for a single column, as illustrated in FIGS. 6(a) to 6(j) above.

If the amount of addition of light absorbing substance is minimized to an extremely small amount, the whole surface area of the columns, which is very large, cannot be wholly covered by uniformly covering the surface of each of the columns. The resulting coating is therefore expected to be one of those illustrated in FIGS. 6(a) to 6(d) and 6(k). Though not shown particularly in the figures, optical polarization properties can be obtained also from columns the surface of which is partially coated to less than 50% of the total surface area, having provided fine granular, island-like, or thin film light absorbing portions on the surface thereof.

Figure 7A:
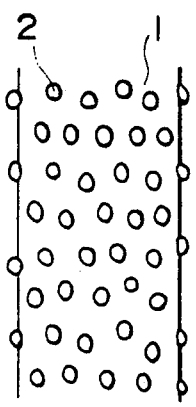
FIGS. 7(a) to 7(c) are the schematically shown column surfaces of the thin film polarizers according to the present invention, having the light absorbing portion(s) provided thereon.
Figure 7B:
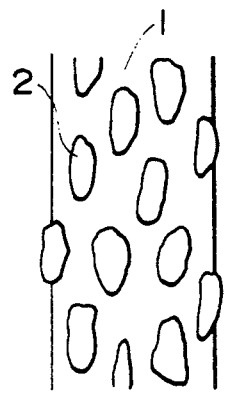
Figure 7C:
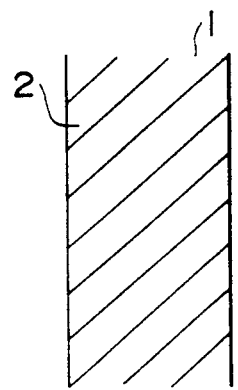

In FIGS. 7(a) to 7(c) are schematically shown column surfaces having provided thereon the light absorbing portions. FIG. 7(a) shows the surface of a column on which fine granular light absorbing portion is provided in spots along the longitudinal and peripheral directions; FIG. 7(b) shows the surface of a column on which island-like light absorbing portion is provided in spots along the longitudinal and peripheral directions; and FIG. 7(c) shows the surface of a column having provided thereon a film of the light absorbing portion. In the example shown in FIG. 7(c), the desired surface may be uniformly or partially covered. In the examples illustrated in FIG. 7, it is preferred from the viewpoint of increasing the light transmittance that the light absorbing substances provided in fine granules or in islands adhere to the surface as discretely as possible along the longitudinal direction of the column.

Figure 8A:
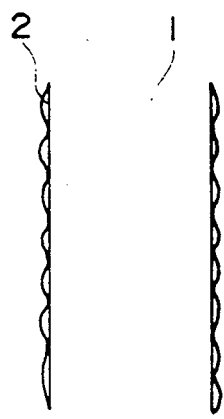
FIGS. 8(a) to 8(c) are the schematically shown vertical sections of the columns of the thin film polarizers according to the present invention, having the light absorbing portion(s) provided thereon.
Figure 8B:
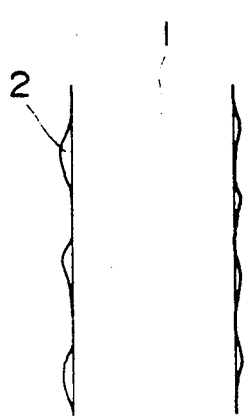
Figure 8C:
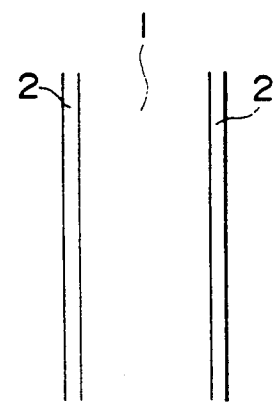

The vertical sections of the columns having the light absorbing portion provided on the surfaces thereof are shown in FIGS. 8(a) to 8(c). FIG. 8(a) shows a state that the surface of the column is densely covered with fine grains, islands, or films of the light absorbing substance; FIG. 8(b) shows a state that the surface of the column is covered discretely with fine grains, islands, or films of the light absorbing substance; and FIG. 8(c) shows a state that the surface of the column is continuously covered with fine grains, islands, or films of the light absorbing substance.

Figure 15:
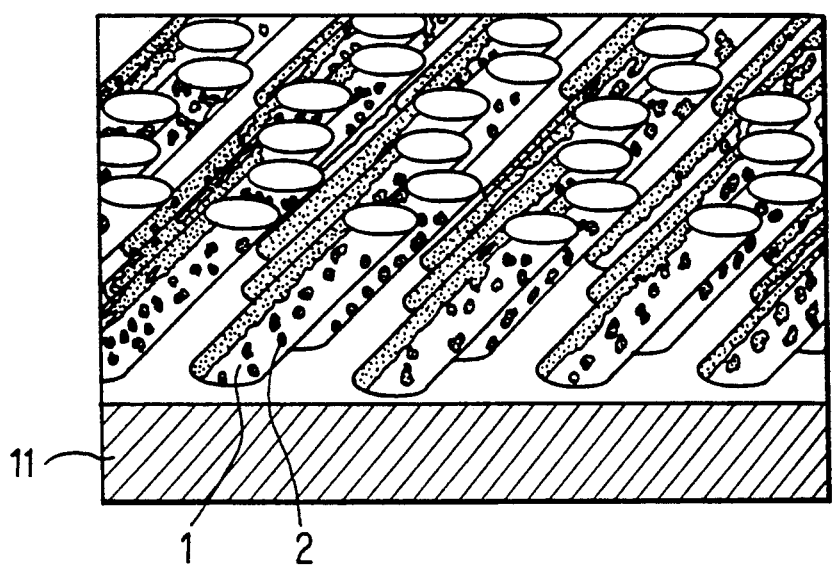
FIG. 15 schematically shows the fine columns continuously extending from an interface between the substrate and the columns to the surface of the inorganic thin film polarizer, without any interruption.

In FIG. 15, fine columns (1) with light absorbing portions (2) deposited on the surface of the fine columns (1), extent continuously from the interface between a substrate (11) and the fine columns (1). The fine columns (1) are continuously extended to the surface of the film without any interruption.

The columns and/or the collective bodies thereof having the light absorbing portion provided on the surfaces thereof are arranged taking between them a spacing of from 0.2 to 20 times the average diameter of the major and the minor axes (i.e., the thickness) of said column and/or the collective body thereof. If the spacing between the columns and/or the collective bodies having provided on the surface thereof the light absorbing portion is less than 0.2 times the thickness defined above, the spacing becomes extremely small as compared with the wavelength of the light, so that the thin film becomes a uniform substance having no anisotropy; if the spacing exceeds 20 times the thickness, on the other hand, the spacing becomes too long with respect to the wavelength of the light, and the resulting structure under the light is then of the same order as the wavelength of the light, which causes the opaque state due to scattering of light. Thus, a spacing between the columns and/or the collective bodies thereof falling in the range out of the defined range is not preferred.

The light absorbing portions are established on the columns or the collective bodies thereof of the matrix for the thin film polarizer, as dots or coatings in the shape of fine grains, islands, or films, and the covered surface accounts for at least 50% of the total surface area.

The ratio by volume of the matrix for the thin film polarizer to the light absorbing portions as calculated as a single film is preferably 10:1 or less, to thereby avoid unnecessary drop in the transmittance of the natural light.

The light absorbing portions comprise dense portions and sparse portions, and said dense portions preferably have orientation.

The dense and sparse portions are present among the light absorbing portions as a whole which have been formed on the surface of the matrix for the thin film polarizer. The dense portions are provided in the direction vertical to the plane of the matrix. Thus, the light absorbing portions are preferably provided in such a morphology that it enhances the difference between the sparse portions and the dense portions. The resulting structure further absorbs the light whose electric vector is in the dense direction.

The inorganic thin film polarizer according to the present invention yields a transmittance of 40% or less and a polarizance of from 70 to 95%. The inorganic thin film polarizer yields a transmittance which is large along the longitudinal direction of the column but which is extremely low at directions other than that. Accordingly, the thin film polarizer has angular selective transmittance.

The inorganic thin film polarizer according to the present invention has favorable polarization characteristics and excellent resistances against weathering and heat. Furthermore, the thin film polarizer according to the present invention comprises a matrix for the thin film polarizer made of a stable inorganic material having a high mechanical strength which is not decomposed nor deteriorated by ultraviolet light, heat, etc. In addition, the light absorbing portions are provided on the surface of the matrix for the thin film polarizer in such a structure that is protected from the outer by the matrix for the thin film polarizer.

The inorganic thin film polarizer according to the present invention can be fabricated into a multifunctional thin film polarizer by imparting an ultraviolet absorbing characteristics to the matrix for the thin film polarizer, or functions such as photochromism and thermochromism to the absorbing portion.

The inorganic thin film polarizer according to the present invention can be obtained by depositing said film on the surface of a transparent substrate made of inorganic materials such as glass or organic materials, e.g., resins.

The process for fabricating the thin film polarizer according to the present invention is briefly described below referring to a working example.

A stable inorganic substance such as an oxide which is transparent in the desired wavelength region of the light is deposited on a substrate from a fixed oblique direction, said substrate being made of an inorganic material such as glass and silicon or of an organic material such as a resin, which is transparent in the desired wavelength region of the light of at least one of the visible light region, the ultraviolet region, and the infrared region. In this way columns or collective bodies thereof can be deposited on the surface of the substrate, being tilted in one direction with respect to the surface normal of the substrate and being arranged taking a spacing of from 0.2 to 20 times as long as the diameter or width of the column or the collective body thereof, to thereby produce a matrix for thin film polarizer having an anisotropy in density.

In the process for fabricating the matrix for the thin film polarizer, the columnar structure having a sufficient anisotropy in density is deposited regardless of the method so long as the direction of deposition is controllable so that an oblique incidence can be applied to the substrate and that a deposited structure uniformly tilted along a single direction with respect to the surface normal can be obtained. Specifically mentioned are vacuum deposition, ion plating, and sputtering methods. In carrying out such deposition processes, an island structure appears in the first stage of the deposition, so that, by uniformly controlling the direction of incidence thereafter it is possible to delay the growth of the shadow portion of the island while growing the islands to a particular direction to finally obtain the columnar structure as desired. Accordingly, an anisotropy appears at the same time.

Light absorbing portions are formed on the columns thus obtained, either simultaneously with the growing of the columns or after once the columns are grown, by coating a stable inorganic material having a larger light extinction coefficient than that of the columns in the desired wavelength region of light. The light absorbing portions may be deposited simultaneously with the matrix for the thin film polarizer by incorporating a material having a large extinction coefficient from a direction of incidence being different from that of the incidence for depositing the matrix for the thin film polarizer, using, for example, vacuum deposition, ion plating, and sputtering methods. Other methods for establishing the light absorbing portions include impregnating the matrix for the thin film polarizer after it is produced with the light absorbing materials by, for example, solution immersion method and an electrochemical process.

Also there is a process which comprises depositing the matrix for the thin film polarizer by vacuum deposition, ion plating, and sputtering methods, wherein a mixture including the constituent materials of the light absorbing portion is used, and thereafter allowing the light absorbing portion to precipitate on the surface of the columns by heat treating the matrix for the thin film polarizer under vacuum, in air, or in an appropriate gas atmosphere.

Thus, since a thin film wholly made of an inorganic material can be easily obtained, an inorganic thin film polarizer having excellent resistances against weathering and heat can be readily fabricated without applying special treatments and post treatments to the substrate. Furthermore, the resulting thin film polarizer is a very thin film having sufficient polarization characteristics. Thus, thin film polarizer can be fabricated on substrates regardless of the material, shape, and size of the substrate.

Preferred process for fabricating the thin film polarizer according to the present invention is described hereinbelow.

The physical vapor deposition (PVD) process suitably applied to the fabrication of the matrix for the thin film polarizer is described hereinbelow. PVD processes include the vacuum deposition, ion plating, and sputtering methods. In carrying out the processes, a thoroughly cleaned substrate is set in the vacuum deposition chamber. To obtain one-direction oriented columns of uniform thickness, the substrate is set in such a manner that the fluctuation in the angle of incidence is minimized and that the deposition is effected from one direction. Specifically, the substrate is oriented so that the angle between the surface normal and the incident flux of the matrix lie at from 45 to 80 degrees. It is also preferred that the substrate is placed 30 cm or more distant from the evaporation source. The evaporation source may be any of the resistance heating type, such as baskets, boats, electron beam (EB) guns, and sputter guns, but preferably, the area of the opening from which the evaporation material is discharged is not so large. No particular restriction is imposed on the deposition method to employ, and any method may be selected from among vacuum deposition, ion plating, and sputtering methods depending on the material to be deposited, on the shape, structure, and the like of the matrix for the thin film polarizer desired to obtain. For example, if the material to be deposited is such having a high vapor pressure at a relatively low temperature and is less apt to decompose, vacuum deposition is most suitable; if the material undergoes decomposition and reduction, favorable is the use of an ion plating method; and if the material is such having a high melting point or such having a low vapor pressure, most preferably used is the sputtering method.

Then, the vacuum chamber is evacuated to $10^{-6}$ Torr to prepare for the vapor deposition. The diameter and the direction of the columns obtained by the oblique vapor deposition are considerably influenced by the material to be vapor deposited, the deposition angle, and the pressure during the deposition, but desirably, the diameter of the column required for the thin film polarizer is about one tenth of the intended wavelength. Accordingly, argon (Ar) gas is introduced to thereby properly control the pressure in the range of from $10^{-6}$ to $10^{-3}$ Torr. However, in the case of simultaneously depositing the light absorbing portion and the matrix for the thin film polarizer, the use of a reactive gas which may react with the light absorbing portion and which is thereby feared to modify the optical properties of the light absorbing portion is not preferred. Furthermore, ion plating and sputtering methods require a gas supply which stably maintains a plasma in the range of from $10^{-4}$ to $10^{-3}$ Torr.

The vapor deposition is then initiated, and the film is deposited until it is grown to the desired thickness.

In the PVD processes mentioned above, the degreasing and the cleaning of the substrate are preferably carried out prior to the deposition to thereby increase the adhesion strength between the thin film and the substrate. If necessary, chemical etching using an acid or an alkali is effected as well. Also, adhesion between the substrate and the thin film may be further increased by selecting heating and ion etching of the substrate as the suitable pretreatment steps. However, the pretreatment processes above may, though dependent on the material used as the substrate, excessively damage the substrate; such damage may exert negative effect on the formation of the columns, and therefore care should be taken sufficiently to exclude such unfavorable effects.

In the case of a sputtering process, the thickness of the film may be easily controlled by controlling the deposition speed with the power input. In the case of vacuum deposition and ion plating processes, the film thickness is monitored using a quartz oscillator or the like.

The subsequent step for depositing the light absorbing portion is carried out by a PVD process such as vacuum deposition, ion plating, and sputtering. The process comprises vapor depositing the starting material for the light absorbing portion in the same process as that used in the deposition of the matrix for the thin film polarizer described above, except for changing the direction of the deposition. The direction for depositing the light absorbing portion is preferably the opposite to that for depositing the matrix for the thin film polarizer, for example, at a deposition angle $\psi$ which is larger than $90° - \theta$ ($\theta$: deposition angle for the matrix). It is also preferred that the substrate is located at a distance 20 cm or more from the evaporation source, and that the vapor deposition angle is kept constant for the light absorbing portion. In this way it is possible to reduce the amount of the vapor deposited light absorbing portion on the shadow zone of the column, and to thereby provide distribution in the morphology of the covering and adhesion of the light absorbing portions on the columns. The anisotropy of the light absorbing portions can be increased as a result. The light absorbing portions should be supplied to an amount necessary to obtain a desired polarized light, however, a coating at an excess amount of the light absorbing substance not only impairs the whole transmittance but also disturbs the orientation of the columns. Thus, it is preferred that the thickness of the light absorbing portion being vapor deposited singly is about one tenth of the thickness of the matrix for the thin film polarizer being singly deposited. Furthermore, in PVD processes, the substance for the light absorbing portions may suffer from drop in the light extinction coefficient due to the oxidation during the film deposition. Accordingly, if a material which may undergo reduction during a heat treatment process or the like were to be used, it is desired that the light absorbing substance once deposited to make a film is heat treated under vacuum or in a reducing atmosphere to reduce the oxidized light absorbing substance and to thereby improve the polarization characteristics. Another point to be made is the occasional inclusion of some light absorbing substance inside the columns. Heat treating of the columns under vacuum, air, or in a proper gas atmosphere may sometimes work effectively and make the inclusion precipitate on the surface of the columns.

The coating with the inorganic thin film polarizer according to the present invention effectively causes light polarization and improves durability. Since such thin film polarizers have a light transmittance to visible light, they may be suitably used as materials of, for example, window shields, sun roofs and mirrors for automobiles, window glasses and sun roofs for houses, and spectacle lenses; or by taking advantage of mainly the polarization characteristics, as materials of interiors of automobiles, containers of chemicals, and the like. The thin film polarizer according to the present invention is also advantageous in the use at the conventional LCD both from the economical viewpoint and productivity, since the film can be directly deposited on the transparent electrodes. It may further be combined with, for example, ¼ (quarter) wave plates and applied to optical and photoelectronic parts.

DETAILED DESCRIPTION OF THE PREFERRED EMBODIMENTS

Some examples of the invention will be described hereinbelow, but it should be understood that the present invention is not to be construed as being limited thereto.

EXAMPLE 1

A thin film polarizer was fabricated on a soda lime glass substrate using tantalum pentaoxide ($Ta_2O_5$) or silicon dioxide ($SiO_2$) with silver (Ag) or copper (Cu) as the evaporation sources. Tests were then carried out to evaluate the performance of the resulting films.

A 1.0 mm thick soda lime glass was washed with acetone and then dried to give the substrate 11.

Figure 1:
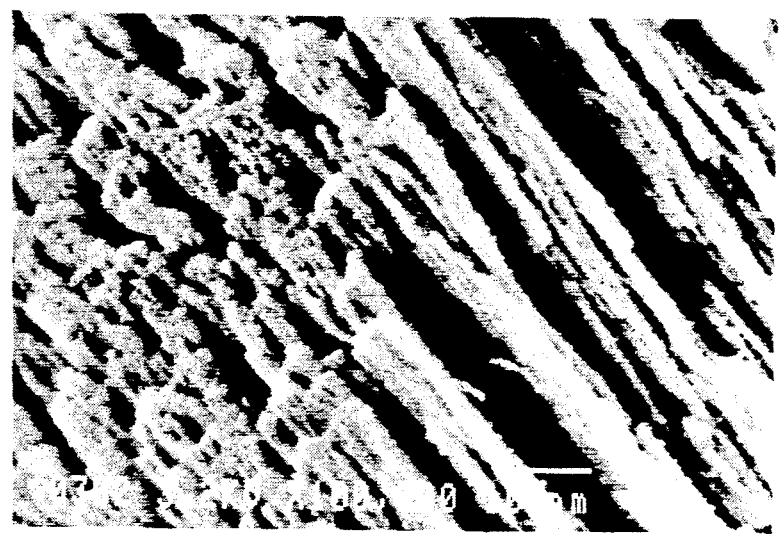
FIG. 1 is the secondary electron micrograph (magnification: 100,000×) showing the shape of the cross section of the inorganic thin film polarizer (Specimen No. 2) obtained in Example 1 according to the present invention.
Figure 10:
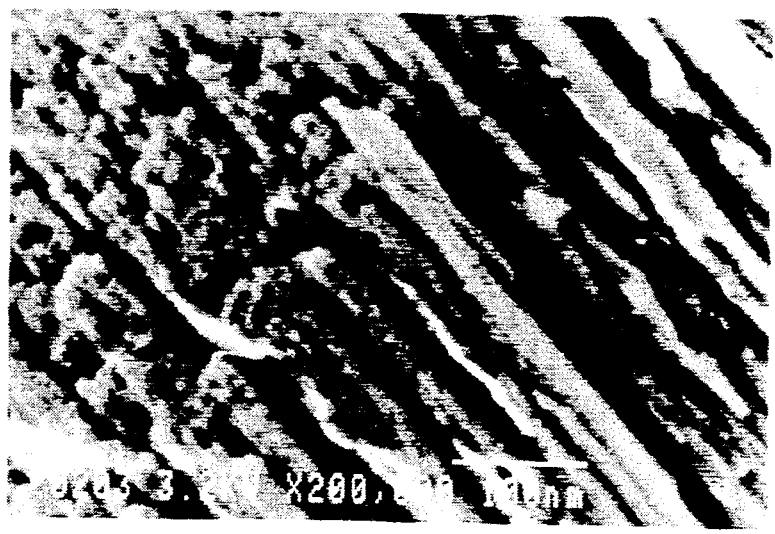
Figure 9:
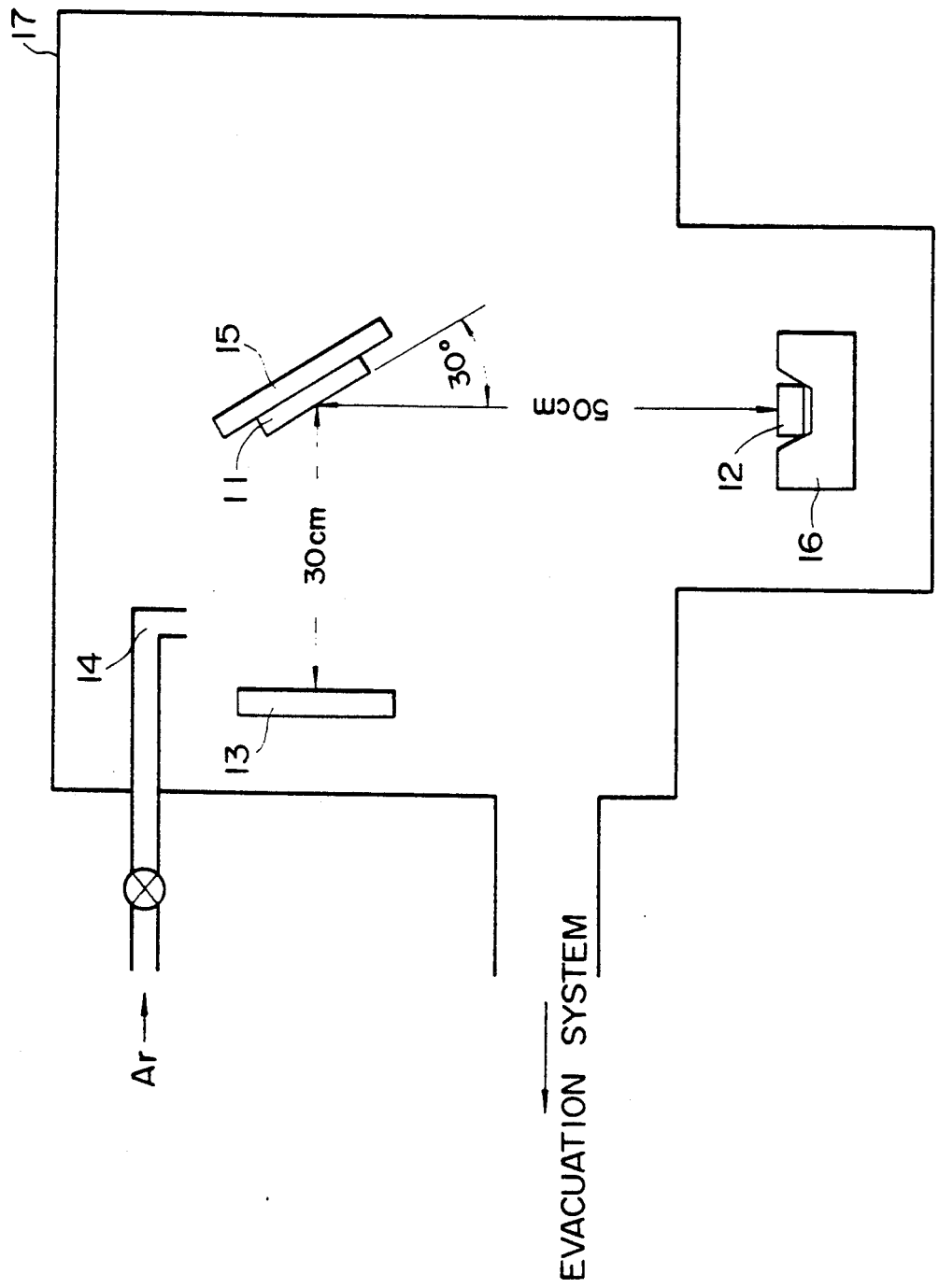
FIG. 9 is the arrangement inside the apparatus for fabricating the thin film polarizer obtained in Example 1.
Figure 11:
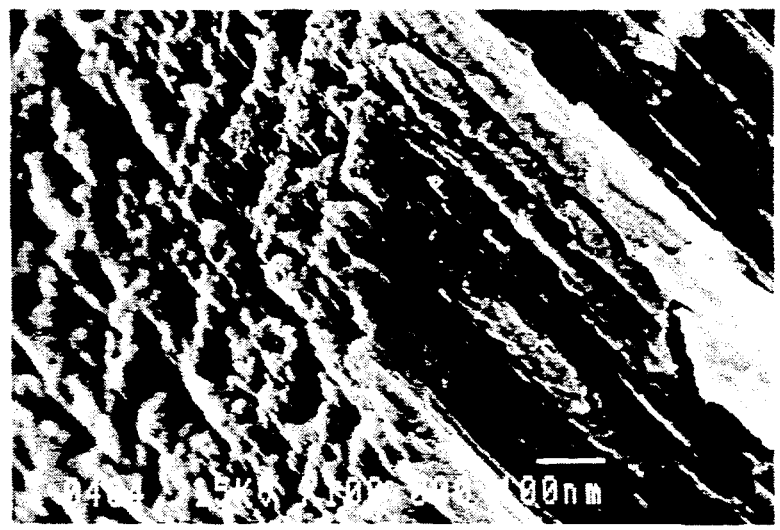
Figure 12:
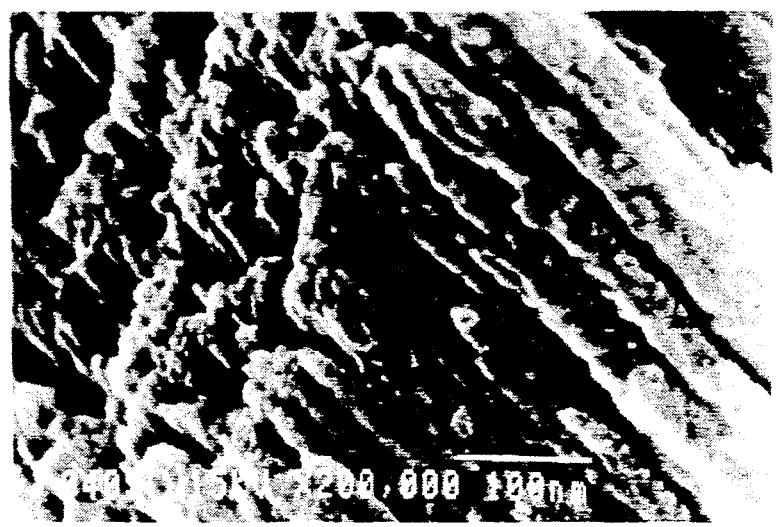
Figure 13:
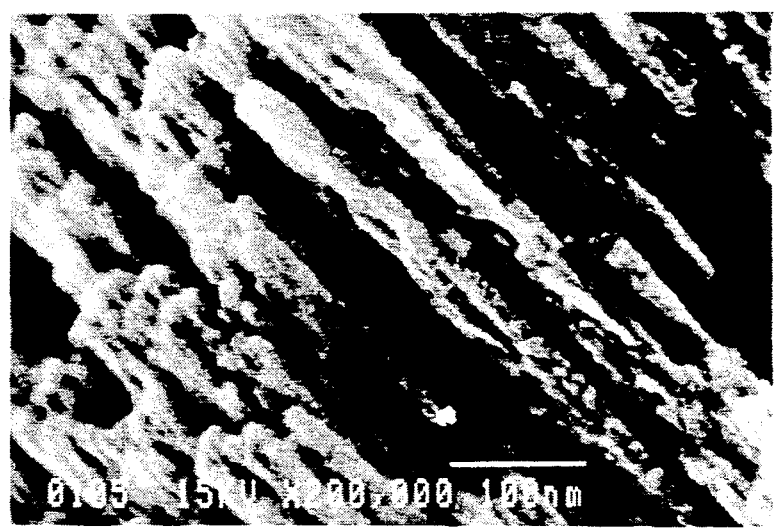
Figure 14:
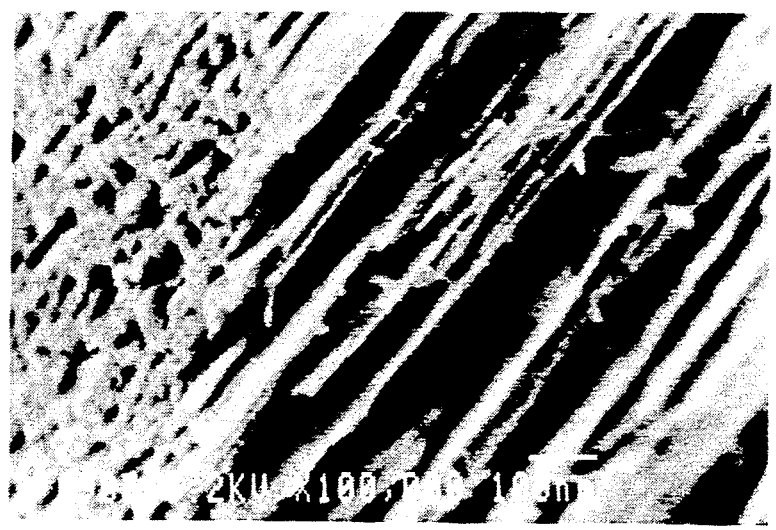
FIG. 14 is the electron micrograph (magnification: 100,000×) showing the shape of the cross section of a film obtained by oblique vapor deposition as a comparative specimen in Example 1.

The substrate 11 was then set on the substrate holder 15 inside the vacuum chamber 17 of a simultaneous film deposition apparatus on which EB vapor deposition and sputtering can be simultaneously carried out, while setting a sintered body of tantalum pentaoxide or silicon oxide on the hearth for EB deposition and setting silver or copper as the sputtering target. The resulting set up inside the deposition apparatus was as shown in FIG. 9. The distance between the hearth for EB source and the glass substrate, and that between the sputtering target and the glass substrate were 50 cm and 30 cm, respectively. After evacuating inside the vacuum chamber to a vacuum of $1.0 \times 10^{-6}$ Torr, and degassing the EB evaporation source 12 ($Ta_2O_5$, $SiO_2$), Ar gas was introduced therein to $3.0 \times 10^{-4}$ Torr, and cleaning of the sputtering target 13 (Ag, Cu) was carried out, and simultaneous deposition of binary film was effected by simultaneously depositing $Ta_2O_5$ or $SiO_2$ by EB vapor deposition and Ag or Cu by RF sputtering. The deposition rate was 200 nm/minute for tantalum pentaoxide or silicon dioxide (calculated as single film), and that for silver or copper was controlled as shown in Table 1. The duration of the deposition was 5 minutes for specimen Nos. 1 to 6, and 2.5 minutes for specimen No. 7. The substrate was not heated. Thus were obtained inorganic polarizers according to the present invention, composed of a substrate and about 1 $\mu$m thick inorganic thin film polarizer (specimen Nos. 1 to 6) and of a substrate and about 0.5 $\mu$m thick inorganic thin film polarizer (specimen No. 7). The inorganic polarizer specimens (Nos. 1, 2, 5, and 7) thus obtained were subjected to a high resolution scanning electron microscope (SEM) observation to observe the fibrous morphology of the columns. The results are given in FIG. 10 (specimen No. 1; 200,000× magnification), FIG. 1 (specimen No. 2; 100,000× magnification), FIG. 11 (specimen No. 5; 100,000× magnification), FIG. 12 (specimen No. 5; 200,000× magnification), and FIG. 13 (specimen No. 7; 200,000× magnification). In FIG. 14 is given an electron micrograph (magnification: 100,000) of a specimen obtained for comparison, which was fabricated using singly EB deposition ($Ta_2O_5$, under $3 \times 10^{-4}$ Torr Ar) with no sputtering targets. As is evident from FIG. 1 and FIGS. 10 to 14, the films according to the present invention comprise $Ta_2O_5$ columns having Ag (FIGS. 1, 10, and 13) or Cu (FIGS. 11 and 12) being deposited on the surface thereof as the light absorbing portions, which are in good contrast with the obliquely deposited film of the comparative specimen (FIG. 14) composed solely of $Ta_2O_5$.

The inorganic polarizers thus obtained were subjected to evaluation tests composed of measurement of spectral transmittance of visible light and polarization, and durability and friction (abrasion resistance) tests.

The spectral transmittance of visible light and polarization were measured. The spectral transmittance was measured at first using $D_{65}$ light source according to JIS Z 8720, and the luminous transmittance was obtained by correcting for the luminosity factor. The polarization as obtained was similarly corrected as above to obtain the corrected polarization. The results are given in Table 1.

From the results in Table 1 it can be seen that the specimens Nos. 2, 4, 5, 6, and 7 yield a spectral transmittance of visible light in the range of from 28 to 35% and a polarization of from 75 to 80%, showing sufficient performance for use as polarizers. Among the specimens thus obtained, specimen No. 1 was inferior in polarization due to too small an amount of Ag, whereas specimen No. 3 yielded too low transmittance due to an excess amount of Ag. Thus, both specimens No. 1 and No. 3 failed to suffice functions required for a polarizer.

TABLE 1

| Specimen No. | Matrix | Deposition Rate (Cu or Ag) (nm/min) | Transmittance of Visible Light T (%) | Polarization P (%) |
|---|---|---|---|---|
| 1 | $Ta_2O_5$ | Ag: 5 | 80 | 10 |
| 2 | $Ta_2O_5$ | Ag: 20 | 30 | 80 |
| 3 | $Ta_2O_5$ | Ag: 70 | 3 | 90 |
| 4 | $SiO_2$ | Ag: 20 | 30 | 80 |
| 5 | $Ta_2O_5$ | Cu: 20 | 35 | 75 |
| 6 | $SiO_2$ | Cu: 70 | 35 | 75 |
| 7 | $Ta_2O_5$ | Ag: 40 | 28 | 80 |

The specimens Nos. 2, 4, 5, 6, and 7 were then subjected to a durability test under conditions given in Table 2 (for a test duration of 1000 hours). The specimens after the durability test were subjected to the same measurement tests for luminous transmittance and polarization as above, and the results are given in Table 2.

TABLE 2

| Specimen No. | 2 | 4 | 5 | 6 | 7 |
|---|---|---|---|---|---|
| 80° C. (RH 95%) | | | | | |
| Luminous Transmittance (%) | 30 | 30 | 35 | 35 | 28 |
| Polarization (%) | 80 | 80 | 75 | 75 | 80 |
| 100° C. | | | | | |
| Luminous Transmittance (%) | 30 | 30 | 35 | 35 | 28 |
| Polarization (%) | 80 | 80 | 75 | 75 | 80 |
| 300° C. | | | | | |
| Luminous Transmittance (%) | 29 | 29 | 40 | 36 | 26 |
| Polarization (%) | 77 | 78 | 70 | 74 | 78 |
| Outdoors | | | | | |
| Luminous Transmittance (%) | 30 | 30 | 37 | 36 | 28 |
| Polarization (%) | 79 | 79 | 72 | 74 | 78 |

The results given in Table 2 clearly show that considerable drop occurred neither in transmittance nor in polarization in any of the test conditions, which proved the inorganic polarizers to have superior durability.

Friction test was further performed on the inorganic polarizer specimen No. 2. To one face of a 20-mm size cube of iron was attached a piece of flannel cloth, and this piece of cloth was impregnated with 2 ml of a commercially available liquid car wax containing compound (a product of Wilson Co., Ltd.; based on a resin and compound). The iron cube having a car wax-impregnated flannel cloth attached thereon was brought into contact with the surface of the specimen under a load of 500 g, and slid back and forth thereon for a distance of 10 cm at a rate of 30 times per minute for 1000 times. Visual inspection of the specimen after the test found no scratches or peeling-offs; furthermore, no drop in transmittance and polarization were found on the specimen after the test.

For comparison, bilayers $Ag/Ta_2O_5$ and $Ta_2O_5/Ag$ were also deposited, respectively, on the same substrate as those used for the specimens above by vacuum deposition. The comparative specimens (C1 and C2) thus obtained were also subjected to friction test in the same manner as above, however, the sample having the $Ag/Ta_2O_5$ bilayer thereon suffered scratches on the surface of the Ag layer, and underwent partial peeling off.

The results evidently show that the inorganic polarizer according to the present invention is improved in resistances against abrasion ascribed to the structural advantage, said structure characterized by the columnar inorganic polarizing portion having the light absorbing portion provided thereon.

While the invention has been described in detail and with reference to specific embodiments thereof, it will be apparent to one skilled in the art that various changes and modifications can be made therein without departing from the spirit and scope thereof.

What is claimed is:

1. An inorganic thin film polarizer comprising:
   i) a substrate which is transparent in a desired wavelength region of light;
   ii) fine columns of an inorganic substance which is transparent to said desired wavelength region of light and having a substantially circular cross-section, said fine columns being arranged on said substrate at a constant angle with respect to a surface normal to said substrate and having anisotropy in density; and iii) light absorbing portions provided on said fine columns, said light absorbing portions being made of an inorganic substance having a light extinction coefficient larger than that of said fine columns in said desired wavelength region of light, wherein said fine columns with said light absorbing portions provided thereon are arranged at a spacing of from 0.2 to 20 times the diameter or width of each of said fine columns.

2. The inorganic thin film polarizer of claim 1, wherein said substrate is formed of at least one member selected from the group consisting of a glass plate, a polymer film and a plastic plate.

3. The inorganic thin film polarizer of claim 1, wherein said fine columns are formed of at least one member selected from the group consisting of tantalum oxide ($Ta_2O_3$), silicon dioxide ($SiO_2$), magnesium oxide (MgO), aluminum oxide ($Al_2O_3$), titanium oxide ($TiO_2$), zinc oxide (ZnO), germanium oxide ($GeO_2$), molybdenum oxide ($MoO_3$), indium oxide ($In_2O_3$), tin oxide ($SnO_2$), tungsten oxide ($WO_3$), silicone (Si) and germanium (Ge).

4. The inorganic thin film polarizer of claim 1, wherein the average diameter of said fine columns is from 5 to 100 nm.

5. The inorganic thin film polarizer of claim 4, wherein said fine columns have such an orientation in their arrangement that they are dense in the direction perpendicular to the plane spanned between the surface normal to the substrate and the tilting direction of said columns and they are sparse in the direction perpendicular to said tilting direction in said plane.

6. The inorganic thin film polarizer of claim 5, wherein the total volume of said columns accounts for 40% or less of the total volume of said thin film polarizer.

7. The inorganic thin film polarizer of claim 4, wherein said columns are from 0.1 to 10 μm in length.

8. The inorganic thin film polarizer of claim 1, wherein said light absorbing portions are formed of at least one metal selected from the group consisting of cooper (Cu), silver (Ag), gold (Au), iron (Fe), cobalt (Co), nickel (Ni), platinum (Pt), tantalum (Ta) and iridium (Ir).

9. The inorganic thin film polarizer of claim 1, wherein said light absorbing portions are formed of at least one semiconductor selected from the group consisting of SnTe, PbSe, PbTe, Si and Ge.

10. The inorganic thin film polarizer of claim 1, wherein said light absorbing portions are formed of at least one electrically conductive oxide selected from the group consisting of ITO and ZnO.

11. The inorganic thin film polarizer of claim 1, wherein said light absorbing portions are formed of fine grains or islands of light absorbing substances.

12. The inorganic thin film polarizer of claim 1, wherein the ratio by volume of said fine columns for the thin film polarizer to said light absorbing portions of 10:1 or less, each calculated as a single film.

13. The inorganic thin film polarizer of claim 12, wherein said light absorbing portions include dense portions and sparse portions, said dense portions having an orientation.

14. The inorganic thin film polarizer of claim 1, wherein said fine columns continuously extend from an interface between said substrate and said columns to a surface of said inorganic thin film polarizer, without any interruption.

* * * * *